(12) United States Patent
Crista

(10) Patent No.: US 6,580,555 B2
(45) Date of Patent: Jun. 17, 2003

(54) ADJUSTABLE EYEPIECE FOR A VIEWING DEVICE

(76) Inventor: Nicolas Crista, 25 Crescent Pl., Hanson, MA (US) 02341

( * ) Notice: Subject to any disclaimer, the term of this patent is extended or adjusted under 35 U.S.C. 154(b) by 0 days.

(21) Appl. No.: 09/920,562

(22) Filed: Aug. 1, 2001

(65) Prior Publication Data

US 2003/0025993 A1 Feb. 6, 2003

(51) Int. Cl.[7] .......................... G02B 23/00; G02B 23/16
(52) U.S. Cl. ....................... 359/426; 359/407; 359/409; 359/600
(58) Field of Search ........................ 359/362, 399–431, 359/480–482, 694–706, 819

(56) References Cited

U.S. PATENT DOCUMENTS

| | | | | |
|---|---|---|---|---|
| 3,540,792 A | * | 11/1970 | Akin, Jr. ..................... | 359/410 |
| 4,955,702 A | * | 9/1990 | Nakamura ................... | 359/409 |
| 5,672,862 A | * | 9/1997 | Ohara et al. ................. | 359/407 |
| 6,195,212 B1 | * | 2/2001 | Miyamoto ................... | 359/699 |
| 6,280,040 B1 | * | 8/2001 | Koide ......................... | 359/600 |

* cited by examiner

*Primary Examiner*—Thong Nguyen
(74) *Attorney, Agent, or Firm*—Fish & Richardson P.C.

(57) ABSTRACT

An adjustable eyepiece for a viewing device includes a diopter ring with at least one cam follower mounted to the diopter ring and a cam sleeve axially aligned with the diopter ring. The cam sleeve is positioned around a tubular portion of the diopter ring and has at least one cam pathway formed in the cam sleeve. Each cam follower that is mounted to the diopter ring is positioned in a cam pathway such that the cam sleeve may be secured in at least two axial positions relative to the diopter ring. In one embodiment of the invention, three cam pathways are formed in the cam sleeve as L-shaped slots, which may be used in combination with three cam followers to secure the cam sleeve in two axial positions relative to the diopter ring.

19 Claims, 3 Drawing Sheets

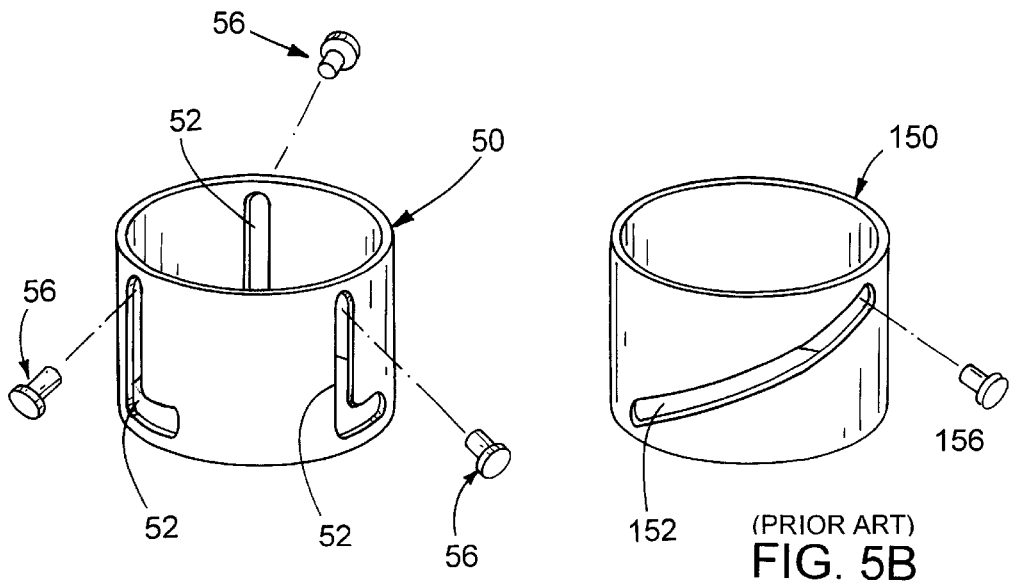
FIG. 5A
(PRIOR ART)
FIG. 5B
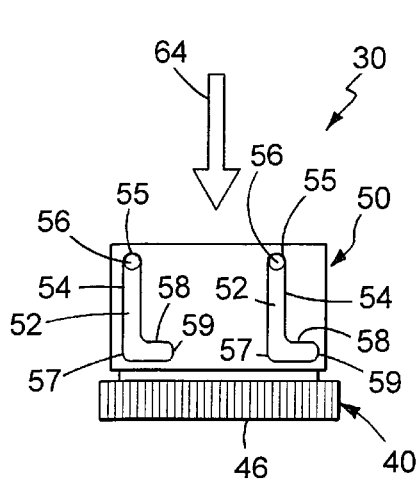
FIG. 4A
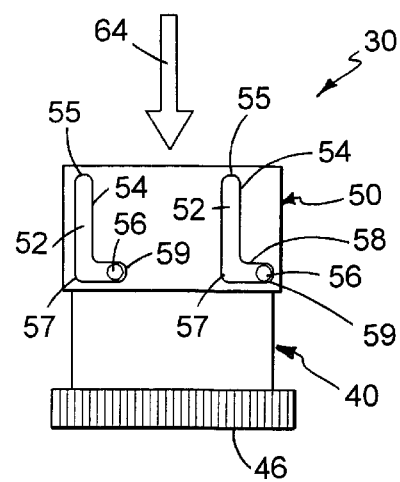
FIG. 4B

ADJUSTABLE EYEPIECE FOR A VIEWING DEVICE

TECHNICAL FIELD

The invention relates to adjusting the eyepiece of a viewing device, such as binoculars.

BACKGROUND

Many types of viewing devices use eyepieces to provide a desirable eye relief for the user. Eye relief is the distance from the user's eye to the lens (or more precisely, from the iris of the user's eye to the lens surface closest to the eye). A user puts the eyepiece of a viewing device against an area around the eye in order to establish and maintain the optimal eye relief for that particular viewing device as determined by the manufacturer. Since the eye relief of the viewing device directly affects the field of view of the user, eyepieces are often adjustable by the user to change the eye relief and, accordingly, the desired field of view of the user.

For example, conventional binoculars may have an adjustable eyepiece positioned between each of the user's eyes and the binocular body. Depending on the user's preferences and the image that is being viewed, the adjustable eyepieces allow the user to change the field of view seen through the eyepieces. The adjustable eyepieces may be set in a particular position so that each of user's eyes is close to the respective first lens in the binoculars, in which case, the binoculars may focus an image with a large field of view in the eyepieces. Then the user may adjust the eyepieces to slightly increase the eye relief between each of the user's eyes and respective first lens in the binoculars. As the eye relief is increased, the outer border of the image is eliminated from the original view and the field of view provided by the binoculars is decreased. For example, the field of view may be intentionally decreased by the user to eliminate an unwanted light source from the outer border of the image while focusing on the desired object.

Eyepieces for binoculars have used a rotational motion provided by the user in order to adjust the eye relief. The adjustable eyepiece has a movable part that is threadably mounted to a fixed part of the eyepiece, or alternatively, a movable part that uses a helical cam pathway and a cam follower to translate the rotating motion provided by the user into the axial motion of the movable part. These prior art adjustable eyepieces are susceptible to unintentional rotation by the user and subsequent change to the field of view seen by the user. Also, viewing devices with more than one adjustable eyepiece, such as binoculars, frequently have eyepieces that are not similarly adjusted, so the user may be required to consciously verify the positions of the eyepieces before each use. For example, binoculars may have one adjustable piece adjusted to provide a small eye relief and the other eyepiece adjusted to provide a larger eye relief, so the user may be required to similarly align eyepieces for better viewing before the next use.

SUMMARY

The invention provides an adjustable eyepiece for a viewing device with a plurality of locking, or secured, axial positions. The adjustable eyepiece of the invention inhibits unintentional motion due to actions of the user and allows the user to easily maintain parallel alignment of multiple eyepieces on a viewing device.

In one aspect of the invention, an eyepiece apparatus for a viewing device with adjustable eye relief comprises a diopter ring to be affixed to the view device so that the diopter ring is stationary with respect to a lens in the viewing device, and a cam sleeve slideably coupled with the diopter ring, the sleeve is axially adjustable relative to the diopter ring so that the eye relief is adjustable. The eyepiece apparatus also includes a cam system associated with the diopter ring and the cam sleeve that enables the sleeve to be secured in at least two axial positions that remain fixed in the presence of an axial force applied to the cam sleeve toward the diopter ring.

In another aspect, the invention provides a viewing device comprising binoculars having a body and at least two lenses for focusing an image to eyes of a user, and two adjustable eyepieces coupled with the body of the binoculars. Each eyepiece includes a diopter ring affixed to the body, a cam sleeve slideably coupled with the diopter ring, and a cam system associated with the diopter ring and the cam sleeve that enables the cam sleeve to be secured in two axial positions relative to the diopter ring. The invention further provides parallel alignment of the user's eyes with respect to the body of the binoculars when the two eyepieces have cam sleeves that are locked in similar axial positions.

In a third aspect of the invention, an eyepiece apparatus for a viewing device comprises a diopter ring with at least one cam follower mounted to the diopter ring, a cam sleeve that is slideably coupled with the diopter ring and axially adjustable relative to the diopter ring such that the eye relief is adjustable, and at least one L-shaped cam pathway formed in the cam sleeve. The L-shaped cam pathways are similar in number to the cam followers such that one cam follower is positioned in each cam pathway to restrict the motion of the cam sleeve relative to the diopter ring. Each L-shaped cam pathway includes a first leg axially extending to a first end of the cam pathway, wherein the cam sleeve is secured in a first axial position when the cam follower abuts the first end of the cam pathway. Additionally, each L-shaped cam pathway includes a second leg tangentially extending to a second end of the cam pathway, wherein the cam sleeve is secured in a second axial position when the cam follower abuts the second end of the cam pathway.

The details of one or more embodiments of the invention are set forth in the accompanying drawings and the description below. Other features, objects, and advantages of the invention will be apparent from the description and drawings, and from the claims.

DESCRIPTION OF DRAWINGS

FIGS. 4A–4B are side views of the adjustable eyepiece from FIG. 3 with a part removed.

FIGS. 5A–5B are perspective views that compare a cam sleeve from a prior art eyepiece and a cam sleeve from the adjustable eyepiece shown in FIG. 3.

Like reference symbols in the various drawings indicate like elements.

DETAILED DESCRIPTION

Figure 1:
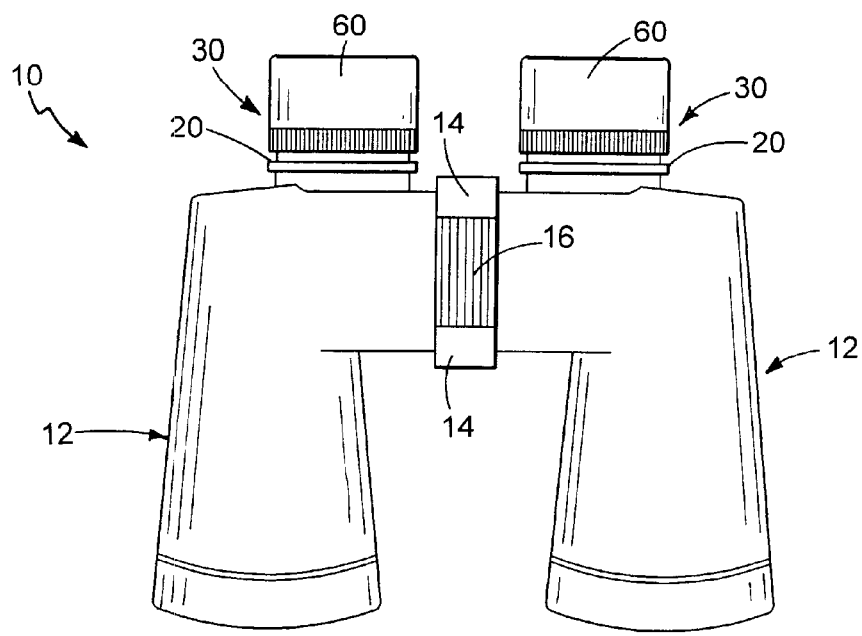
FIG. 1 is a side view of binoculars having adjustable eyepieces in accordance with the invention.
Figure 2:
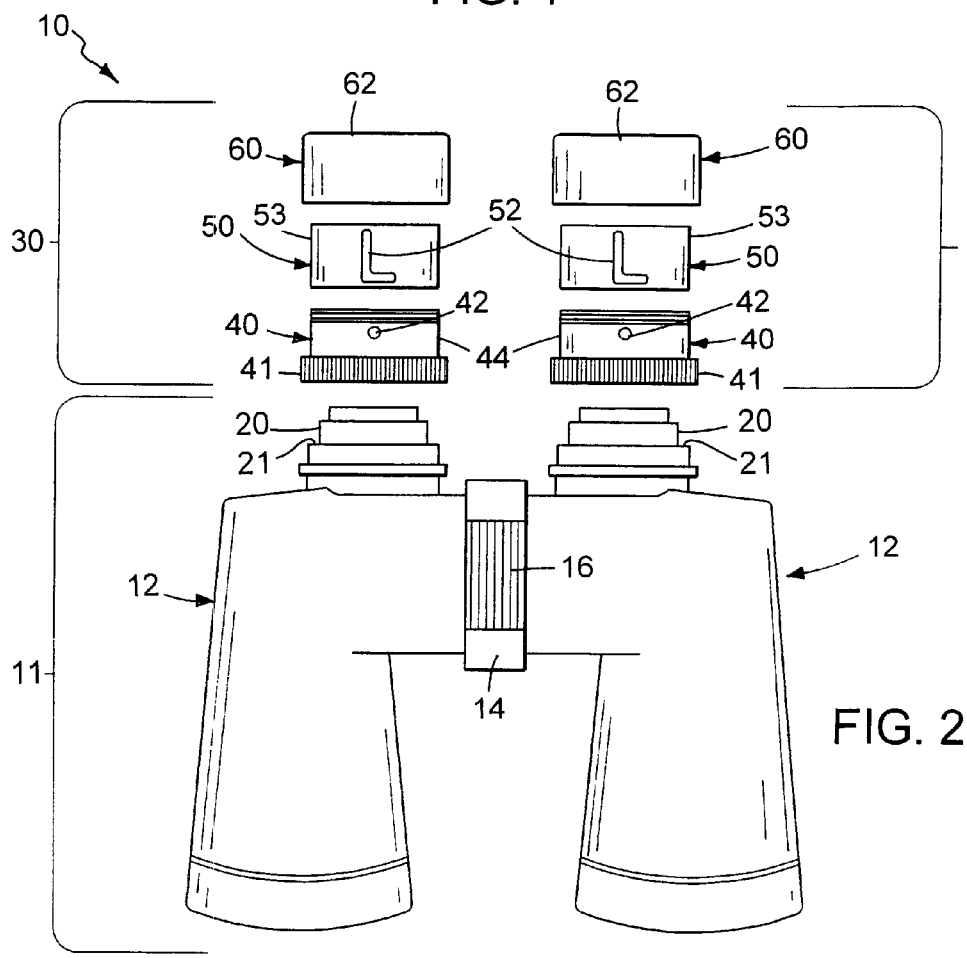
FIG. 2 is the same side view as FIG. 1, except with the adjustable eyepieces shown in exploded view.

Binoculars 10 having a pair of adjustable eyepieces 30 in accordance with the invention are shown in FIG. 1. In more detail, an exploded view of the adjustable eyepieces 30 with the binocular body 11 is shown in FIG. 2. The body 11 of the binoculars 10 includes two housings 12 attached together by a hinge connection 14, which may be adjusted to align the eyepieces 30 with the eyes of a user. Each housing 12 may enclose at least one optical lens (not shown) for focusing an image to the user's eye, such as a conventional refractive or reflective lens. The body 11 of the binoculars 10 may also include a typical image focusing apparatus 20 that protrudes from the housing 12. The image focusing apparatus 20 may also include an optical lens (not shown). A focus adjustment dial 16 aligned with the hinge connection 14 allows the position of the image focusing apparatus 20 relative to the housings 12 to be adjusted by the user in order to improve the image focus. The image focusing apparatus 20 is a part of the binocular body 11 that may slideably receive the adjustable eyepiece 30. The adjustable eyepiece 30 may be affixed to the image focusing apparatus 20 using a conventional adhesive.

Each adjustable eyepiece 30 includes a diopter ring 40, a cam sleeve 50, and an eyecup 60. Each diopter ring 40 is affixed to the image focusing apparatus 20, and remains stationary relative to the lens of the image focusing apparatus 20. The diopter ring 40 has a ring base portion 41 that fits over and abuts a base surface 21 of the image focusing apparatus 20. The diopter ring 40 includes an aperture 42 that may be threaded to receive a cam follower (not shown in FIGS. 1 and 2, but described later). A tubular portion 44 of each diopter ring 40 slideably receives the cam sleeve 50 such that the cam sleeve 50 fits over the tubular portion 44 of the diopter ring. Each cam sleeve 50 includes at least one cam pathway 52 formed through the cam sleeve 50. One cam follower may be positioned in each cam pathway 52 and mounted to the diopter ring 40. As described later in detail, the cam sleeve 50 may be secured in two axial positions relative to the diopter ring 40 using the cam follower positioned in the cam pathway 52. The eyecup 60 may be made of a rubber material that is tightly fitted around the cam sleeve 50. The tension of the rubber eyecup material around the cam sleeve may secure the eyecup 60 to the cam sleeve 50. Accordingly, when the cam sleeve 50 is adjusted to one of the two axial positions relative to the diopter ring 40, the eyecup 60 is similarly adjusted relative to the diopter ring 40. The eyecup 60 includes a proximal end 62, which may receive the eye of the user. Thus, the adjustable eyepiece 30 may be used to adjust the eye relief by securing the proximal end 62 in one of two axial positions relative to the binocular body 11.

Figure 3:
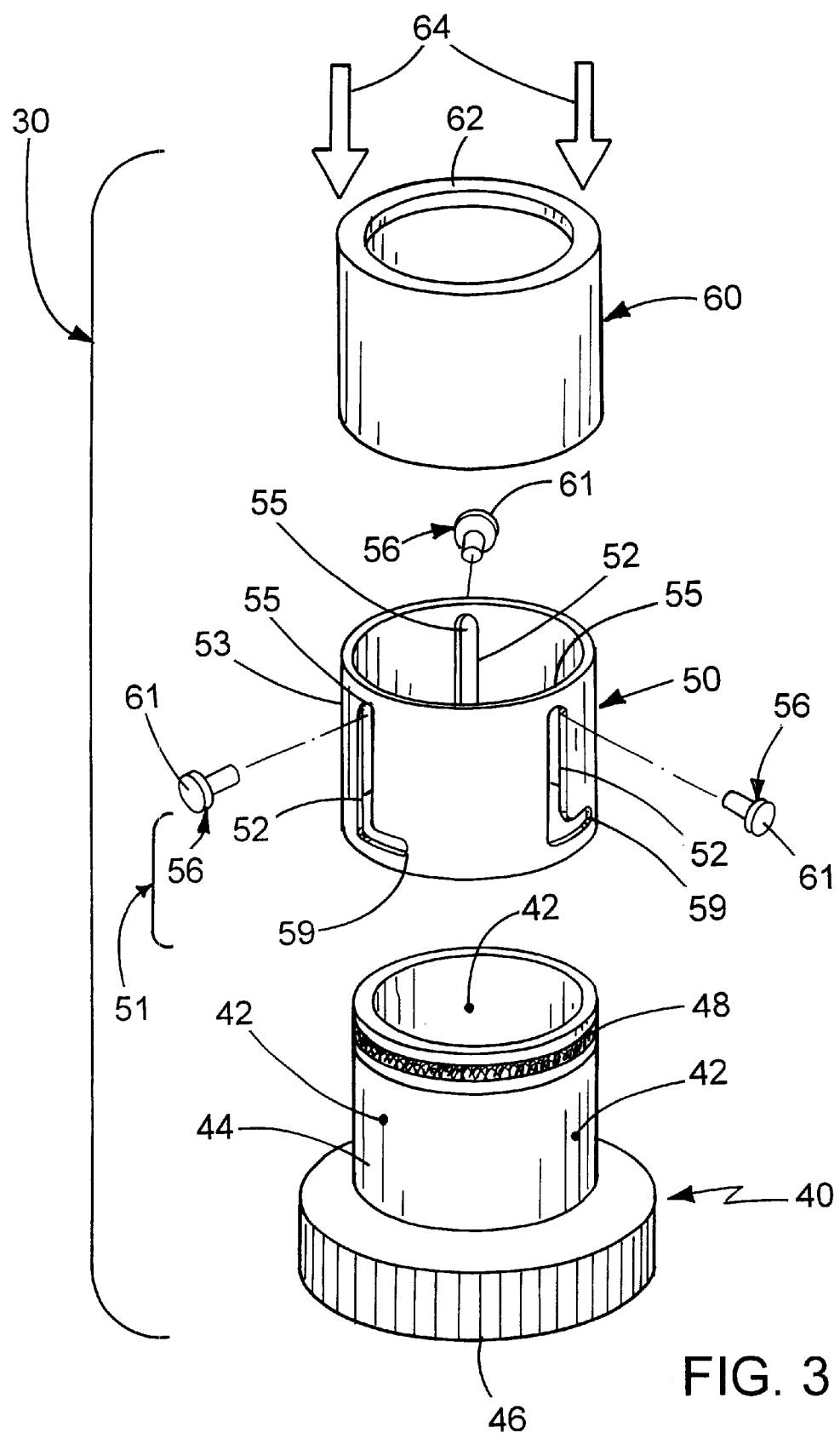
FIG. 3 is an exploded perspective view of one of the adjustable eyepieces from FIG. 2.

FIG. 3 shows an exploded perspective view of one of the adjustable eyepiece 30 from FIG. 2. The diopter ring 40 includes a distal end 46 that remains stationary relative to the image focusing apparatus 20 of the binocular body 11 (see FIGS. 1 and 2). Also, the diopter ring 40 may include a conventional o-ring 48 that is positioned around the tubular portion 44 of the diopter ring 40 to provide a seal between the cam sleeve 50 and the tubular portion 44 of the diopter ring 40. In this embodiment, the diopter ring 40 has three equally spaced apertures 42 for mounting three cam followers 56 to the diopter ring 40. Correspondingly, the cam sleeve 50 has three equally spaced cam pathways 52 that are L-shaped slots formed in the cam sleeve 50. In accordance with the invention, the cam followers 56 and cam pathways 52 make up a cam system 51 associated with the diopter ring 40 and the cam sleeve 52 that is used to restrict the movement of the cam sleeve 50 with respect to the diopter ring 40. The cam sleeve 50 may be slideably coupled with tubular portion 44 and the o-ring 48 of the diopter ring 40 so that the cam pathways 52 align with the apertures 42. With the cam sleeve 50 positioned over the tubular potion 44 of the diopter ring 40, and with the cam pathways 52 aligned with the apertures 42, the cam followers 56 are positioned through the pathways 52 and mounted to the apertures 42 of the diopter ring 40. The heads 61 of the cam followers 56 may have a diameter that is slightly smaller than the width of the cam pathways 52, so the heads 61 may slide within the cam pathways 52. Also, the height of the heads 61 may be substantially similar to the circumferential thickness of the cam sleeve 50, so the heads 61 do not protrude past a circumferential surface 53 of the cam sleeve. The eyecup 60 is fitted around the cam sleeve 50 so as to cover the cam pathways 52 and cam followers 56. The area around the user's eye may abut the proximal end 62 of the eyecup 60 to view an image. In such a case, the user provides a force on the eyecup 60 and cam sleeve 50 in a direction 64 toward the distal end 46.

FIGS. 4A–4B show an assembled adjustable eyepiece 30 apparatus of FIG. 3 with the eyecup 60 removed to better view the cam followers 56 and the cam pathways 52. The cam followers 56 being restricted to move only within the cam pathways 52 restricts the motion of the cam sleeve 50 relative to the diopter ring 40. Each L-shaped cam pathway 52 includes a first leg 54 extending in the axial direction from a first end 55 to a vertex portion 57 and a second leg 58 extending in the tangential direction from the vertex portion 57 to a second end 59. The cam followers 56 may abut either the first end 55 or the second end 59 in order to secure the axial position of the cam sleeve 50 relative to the diopter ring 40. As shown in FIG. 4A, the cam followers 56 abut the respective first ends 55 of cam pathways 52 to secure the cam sleeve 50 in a first axial position relative to the diopter ring 40. When the force from the user is applied in the previously described direction 64, the secured position of the cam sleeve 50 relative to the diopter ring 40 remains fixed because the motion of the cam sleeve 50 is restricted to follow the track of the cam pathway 52. The user may adjust the cam sleeve 50 position with a simple pull-and-twist motion. From the first position shown in FIG. 4A, the user may lightly pull the cam sleeve in the axial direction away from the distal end 46 of the diopter ring 40. In this embodiment, the cam sleeve 50 may be moved in the axial direction a distance of about ⅜-inch, although other distances are within the scope of this invention. Then the user may lightly twist the cam sleeve 50 relative to the diopter ring so as to abut the cam follower 56 against the second end 59 within the second leg 58 of the cam pathway 52, as shown in FIG. 4B. In this embodiment, the cam sleeve 50 may be moved in the tangential direction a distance of about ⅛-inch, although other distances are within the scope of the invention. FIG. 4B shows the cam sleeve secured in the second axial position where the cam sleeve 50 is positioned further away in the axial direction from the distal end 46 of the diopter ring 40 compared to the first position shown in FIG. 4A. Again, because the motion of the cam sleeve 50 is restricted to follow the track of the cam pathway 52, the force from the user applied in the previously described direction 64 does not affect the position of the cam sleeve 50 relative to the diopter ring 40.

A comparison of cam sleeve 50 to a prior art cam sleeve 150 is shown in FIGS. 5A–5B. Referring to FIG. 5A, the prior art cam sleeve 150 includes a single helical pathway 152 with a cam follower 156 that is mounted to a diopter ring (not shown). When the prior art cam sleeve 150 is twisted relative to the diopter ring, the axial position of the cam sleeve 150 changes relative to the diopter ring. However, the force applied from the user may unintentionally alter the axial position of the cam sleeve 150 because the helical pathway 152 does not provide secured positions for the cam follower 156. Thus, a pair of prior art eyepieces used on binoculars may not maintain parallel alignment because one eyepiece may be accidentally adjusted from the force of the user or other unintentional contact. Also, the helical cam pathway 152 and single cam follower 156 mounted to the diopter ring is not statically stable, so some forces applied to the cam sleeve 150 may cause the axis of the cam sleeve 150 to be tilted away from the axis of the diopter ring, which may degrade the focusing of an image. Now referring to FIG. 5B, the cam pathways 52 of the cam sleeve 50 in accordance with the invention provide the adjustable eyepiece 30 with two secured positions. The three evenly spaced cam pathways 52 and cam followers 56 provide an adjustable eyepiece 30 that is statically stable when a force is applied from the user's eye. The invention provides a pair of eyepieces 30 used on binoculars 10 that may maintain parallel alignment with each other when the two eyepieces 30 have cam sleeves 50 that are locked in similar axial positions.

A number of embodiments of the invention have been described. Nevertheless, it will be understood that various modifications may be made without departing from the spirit and scope of the invention. For example, the adjustable eyepiece 30 may be used with a viewing device other than binoculars 10, such as monoculars, telescopes, microscopes, or spotting scopes. In a further embodiment of the invention, the cam pathway 52 may be a shape that provides two secured positions other than an L-shape. Further yet, the cam pathway 52 may be a shape that provides more than two secured positions, such as an E-shape, which may provide three secured positions. Additionally, the diopter ring 40 may be coupled with a part of the body 11 other than the image focusing apparatus 20, for example, the diopter ring 40 may be affixed directly to the housing 12 instead of to the image focusing apparatus 20. In another embodiment, the cam system 51 may use a cam pathway 52 formed in the diopter ring 40 and a cam follower 56 mounted to the cam sleeve 50. Accordingly, other embodiments are within the scope of the following claims.

What is claimed is:

1. An eyepiece for a viewing device with adjustable eye relief, the eyepiece comprising:
   a diopter ring to be affixed to the view device so that the diopter ring is stationary with respect to a lens in the viewing device;
   a sleeve slideably coupled with the diopter ring, the sleeve being axially adjustable relative to the diopter ring so that the eye relief is adjustable; and
   a cam system associated with the diopter ring and the sleeve that enables the sleeve to be situated in at least two axial positions, each of the at least two axial positions allowing viewing through the eyepiece, wherein the cam system is capable of preventing axial movement of the sleeve toward the diopter ring at each of the at least two axial positions in the presence of an axial force applied to the sleeve toward the diopter ring.

2. The eyepiece of claim 1, wherein the cam system includes at least one cam follower and at least one cam pathway such that the number of cam followers is equal to the number of cam pathways.

3. The eyepiece of claim 2, wherein the at least one cam pathway is formed in the sleeve.

4. The eyepiece of claim 3, wherein the at least one cam follower is mounted to the diopter ring such that one cam follower is positioned in each cam pathway to restrict the motion of the sleeve relative to the diopter ring.

5. The eyepiece of claim 4, wherein there are three equally spaced cam pathways formed in the sleeve.

6. The eyepiece of claim 4, wherein each cam pathway is an L-shaped slot formed in the sleeve.

7. The eyepiece of claim 6, wherein each L-shaped cam pathway further comprises:
   a first leg axially extending to a first end of the cam pathway such that the sleeve is secured in a first axial position when the cam follower abuts the first end of the cam pathway; and
   a second leg tangentially extending to a second end of the cam pathway, wherein the sleeve is secured in a second axial position when the cam follower abuts is within the second leg of the cam pathway.

8. The eyepiece of claim 1, wherein an eyecup is fitted around the sleeve.

9. A binoculars instrument with adjustable eye relief, comprising:
   a body having at least two lenses for focusing an image to the eyes of a user; and
   two adjustable eyepieces affixed to the body of the binoculars, each eyepiece including a diopter ring affixed to the body so that each diopter ring is stationary with respect to one of the at least two lenses, a sleeve slideably coupled with the diopter ring and axially adjustable relative to the diopter ring, and a cam system associated with the diopter ring and the sleeve that enables the sleeve to be situated in two axial positions relative to the diopter ring, each of the two axial positions allowing viewing through the eyepiece so that the eye relief is adjustable, wherein the cam system is capable of preventing axial movement of the sleeve toward the diopter ring at each of the two axial positions in the presence of an axial force applied to the sleeve toward the diopter ring;
   wherein the two eyepieces with sleeves locked in similar axial positions provide parallel alignment of the eyes of the user with respect to the body of the binoculars.

10. The binoculars instrument of claim 9, wherein the cam system includes at least one cam follower and at least one cam pathway such that the number of cam followers is equal to the number of cam pathways.

11. The binoculars instrument of claim 10, wherein the at least one cam pathway is formed in the sleeve.

12. The binoculars instrument of claim 11, wherein the at least one cam follower is mounted to the diopter ring such that one cam follower is positioned in each cam pathway to restrict the motion of the sleeve relative to the diopter ring.

13. The binoculars instrument of claim 12, wherein there are three equally spaced cam pathways formed in the sleeve.

14. The binoculars instrument of claim 12, wherein each cam pathway is an L-shaped slot formed in the sleeve.

15. The binoculars instrument of claim 14, wherein each L-shaped cam pathway further comprises:
   a first leg axially extending to a first end of the cam pathway such that the sleeve is secured in a first axial position when the cam follower abuts the first end of the cam pathway; and
   a second leg tangentially extending to a second end of the cam pathway, wherein the sleeve is secured in a second axial position when the cam follower is within the second leg of the cam pathway.

16. The binoculars instrument of claim 9, wherein each eyepiece further comprises an eyecup is fitted around the sleeve.

17. An eyepiece for a viewing device with adjustable eye relief, the eyepiece comprising:

a diopter ring with at least one cam follower mounted to the diopter ring;

a sleeve slideably coupled with the diopter ring, the sleeve being axially adjustable relative to the diopter ring so that the eye relief is adjustable, the sleeve having at least one L-shaped cam pathway formed in the sleeve, the number of cam pathways being equal in number to the number of cam followers such that one cam follower is positioned in each cam pathway to restrict the motion of the sleeve relative to the diopter ring, and each cam pathway comprising:

a first pathway leg axially extending in the sleeve from a first end of the cam pathway to a vertex portion of the cam pathway, wherein the sleeve is in a first axial position which allows viewing through the eyepiece when the cam follower abuts the first end of the cam pathway; and a second leg tangentially extending in the sleeve from the vertex portion of the cam pathway to a second end of the cam pathway, wherein the sleeve is in a second axial position which allows viewing through the eyepiece when the cam follower is within the second leg of the cam pathway, wherein the second leg is capable of preventing axial movement of the sleeve toward the diopter ring in the presence of an axial force applied to the sleeve toward the diopter ring.

18. The eyepiece of claim 17, wherein there are three equally spaced cam pathways formed in the sleeve.

19. The eyepiece of claim 18, further comprising an eyecup is fitted around the sleeve.

* * * * *